United States Patent
Rader (10) Patent No.: US 9,931,746 B2
(45) Date of Patent: Apr. 3, 2018

(54) HANDLE CONFIGURATION FOR POWER IMPLEMENTS

(71) Applicant: Todd Rader, Kalama, WA (US)

(72) Inventor: Todd Rader, Kalama, WA (US)

(*) Notice: Subject to any disclaimer, the term of this patent is extended or adjusted under 35 U.S.C. 154(b) by 694 days.

(21) Appl. No.: 14/491,695

(22) Filed: Sep. 19, 2014

(65) Prior Publication Data

US 2015/0083452 A1    Mar. 26, 2015

Related U.S. Application Data (60) Provisional application No. 61/880,633, filed on Sep. 20, 2013.

(51) Int. Cl.
*B25G 1/06* (2006.01)
*A01D 34/90* (2006.01)

(52) U.S. Cl.
CPC ............ *B25G 1/06* (2013.01); *A01D 34/902* (2013.01); *Y10T 16/476* (2015.01)

(58) Field of Classification Search
CPC ................................ A01D 34/902; B25G 1/06
USPC ......................................................... 173/170
See application file for complete search history.

(56) References Cited

U.S. PATENT DOCUMENTS

| D165,919 S | 6/1867 | Korn |
|---|---|---|
| D252,130 S | 6/1979 | Hoff |
| 4,179,805 A | 12/1979 | Yamada |
| 4,364,435 A | 12/1982 | Tuggle et al. |
| 4,442,659 A | 4/1984 | Enbusk |
| RE32,266 E | 10/1986 | Tuggle et al. |
| 4,615,553 A | 10/1986 | Hultine |
| 4,662,158 A | 5/1987 | Zerrer |
| D290,365 S | 6/1987 | Hatano et al. |
| 4,702,005 A | 10/1987 | Pittinger, Sr. et al. |

(Continued)

FOREIGN PATENT DOCUMENTS

EP    0 098 068    1/1984

OTHER PUBLICATIONS

International Search Report and Written Opinion, dated Dec. 29, 2014, for corresponding PCT Patent Application No. PCT/US2014/056640, by the ISA/US, 8 pp.

(Continued)

*Primary Examiner* — Michelle Lopez
*Assistant Examiner* — Chinyere Rushing-Tucker
(74) *Attorney, Agent, or Firm* — Klarquist Sparkman, LLP (57) ABSTRACT

Handle configurations are disclosed for powered implements having a shaft, allowing the implements to be holdable by both hands of a user. An exemplary implement has an elongated shaft having first and second end portions. A first handhold is adjustably mounted to the shaft and extends outwardly therefrom. A second handhold is adjustably mounted either to the shaft or to an elongated member coupled to the shaft. The elongated member can include a mounting portion and a handle portion providing the second handhold. The mounting portion mounts to the first end portion at a mounting location. The first and second handholds allow operation of the implement by a user with arms in respective neutral arm positions and hands in respective neutral gripping positions. The elongated member allows transmission of a force applied to the second handhold by the user through the elongated member and to the elongated shaft at the mounting location.

15 Claims, 9 Drawing Sheets

(56) References Cited

U.S. PATENT DOCUMENTS

| | | | |
|---|---|---|---|
| 4,845,929 A | 7/1989 | Kawasaki et al. | |
| D333,954 S | 3/1993 | Karlsson et al. | |
| 5,263,303 A | 11/1993 | Stroud | |
| D342,425 S | 12/1993 | Watanabe et al. | |
| D355,817 S | 2/1995 | Nakadachi | |
| 5,546,749 A * | 8/1996 | Couchee | B25G 1/04 16/421 |
| 5,661,960 A | 9/1997 | Smith et al. | |
| 5,662,428 A | 9/1997 | Wilson | |
| 5,842,277 A | 12/1998 | Haberlein et al. | |
| 6,082,087 A | 7/2000 | Tada et al. | |
| 6,176,016 B1 | 1/2001 | Higashi et al. | |
| 6,240,644 B1 | 6/2001 | Lawrence | |
| 6,493,944 B2 | 12/2002 | Jarzombek | |
| 6,581,246 B1 | 6/2003 | Polette | |
| 6,662,428 B2 | 12/2003 | Esaki et al. | |
| 6,701,623 B2 | 3/2004 | Sanders | |
| 6,739,058 B2 | 5/2004 | Warashina et al. | |
| 6,880,251 B2 | 4/2005 | Gambert | |
| D609,067 S | 2/2010 | Tinius | |
| 7,707,684 B2 | 5/2010 | Hittmann et al. | |
| 7,805,844 B2 | 10/2010 | Yoshida | |
| 7,891,099 B2 | 2/2011 | Wenckel | |
| 8,042,220 B2 | 10/2011 | Hittmann et al. | |
| 8,117,756 B2 | 2/2012 | Nakaya et al. | |
| 8,127,455 B2 | 3/2012 | Wenckel et al. | |
| D668,518 S | 10/2012 | Landberg | |
| 2004/0128839 A1* | 7/2004 | Shaffer | A01D 34/902 30/276 |
| 2004/0255471 A1 | 12/2004 | Black | |
| 2005/0000095 A1* | 1/2005 | Warashina | A01D 34/90 30/276 |
| 2006/0123635 A1 | 6/2006 | Hurley et al. | |
| 2007/0068008 A1* | 3/2007 | Wu | A01D 34/902 30/276 |
| 2007/0199294 A1 | 8/2007 | Breneman et al. | |
| 2008/0092398 A1* | 4/2008 | Hurley | A01D 34/905 30/276 |
| 2008/0127620 A1 | 6/2008 | Marcinczyk | |
| 2009/0217637 A1 | 9/2009 | Dunn | |
| 2009/0229131 A1* | 9/2009 | Tomiyama | A01D 34/90 30/276 |
| 2010/0012338 A1* | 1/2010 | Okabe | A01D 34/902 173/162.2 |
| 2010/0088902 A1 | 4/2010 | Hurley | |
| 2010/0294098 A1 | 11/2010 | Nakadate et al. | |
| 2010/0313430 A1 | 12/2010 | Yamaoka et al. | |
| 2011/0083328 A1 | 4/2011 | Miyahara et al. | |
| 2011/0131817 A1 | 6/2011 | Ito | |
| 2011/0162214 A1 | 7/2011 | Codeluppi | |
| 2011/0173820 A1 | 7/2011 | Pelleng | |
| 2011/0203118 A1* | 8/2011 | Saito | A01D 34/902 30/276 |
| 2012/0167399 A1 | 7/2012 | Codeluppi | |
| 2012/0180322 A1 | 7/2012 | Takeda et al. | |
| 2012/0180445 A1 | 7/2012 | Duller | |
| 2012/0204428 A1 | 8/2012 | Yang | |
| 2012/0246943 A1 | 10/2012 | Yuasa | |
| 2013/0014393 A1 | 1/2013 | Yamashita | |
| 2013/0161047 A1* | 6/2013 | Hallendorff | A01D 34/902 173/170 |
| 2013/0333229 A1* | 12/2013 | Williams | B25G 1/04 30/296.1 |
| 2014/0013542 A1* | 1/2014 | Wang | A01D 34/824 16/429 |
| 2014/0208597 A1* | 7/2014 | Zhou | A01D 34/90 30/276 |
| 2016/0021819 A1* | 1/2016 | Nakano | A01G 3/062 30/276 |

OTHER PUBLICATIONS

Supplementary Extended European Search Report, dated Aug. 17, 2017, by the European Patent Office for corresponding European Patent Application No. 14846596.6, 11 pp.

* cited by examiner

HANDLE CONFIGURATION FOR POWER IMPLEMENTS

CROSS REFERENCE TO RELATED APPLICATION

This application claims priority to and the benefit of U.S. Provisional Application No. 61/880,633, filed Sep. 20, 2013, which is hereby incorporated by reference in its entirety.

FIELD

The present disclosure relates to handle apparatus and configurations for implements having a longitudinal shaft and which are normally held by both hands during use, such as (but not limited to) landscaping implements.

BACKGROUND

Figure 1:
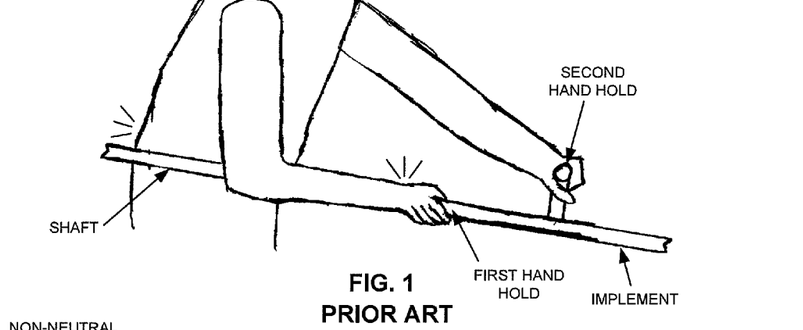
FIG. 1 is a side elevation view of a user holding a prior art implement.

Powered, handheld implements such as weed trimmers, lawn edgers, brush cutters, etc., are examples of tools normally held by both hands during use. These implements and others like them generally include a longitudinal shaft with a motor or other power source mounted on the rear portion of the shaft and a cutting head or other energetic device, driven or energized by the power source, mounted on the front portion of the shaft. A conventional powered implement generally includes two handholds, as shown in FIG. 1. A first handhold (e.g., a "rear" handhold) is located forwardly of the power source (not shown) and is often a round-the-shaft swell or grip portion coaxial with the shaft (FIG. 1). The first handhold in many instances includes a control device such as a trigger and/or throttle for controlling operation of the power source or delivery of energy from the power source to the energetic device. A second handhold (e.g., a "front" handhold) is located generally midway along the shaft and is often a D-grip rigidly affixed to the shaft and extending outwardly from the shaft.

Many such implements, particularly self-powered implements, require that the user hold the implement with both hands to support its weight and to guide the energetic device on the end of the shaft controllably during use. However, the position of the first and second handholds on conventional implements presents a variety of problems, especially when using the implement for prolonged periods. More specifically, the shape and location of the first handhold forces the wrist to assume a stressful position of ulnar deviation relative to the forearm, illustrated by arrow 55 of FIG. 4 (see also FIG. 1), which can cause maladies in the user such as carpal tunnel syndrome. Secondly, the shape and location of the second handhold generally midway along the shaft require that the holding arm be outstretched, which forces the wrist of the outstretched arm to assume a relatively weak pronated gripping position (see FIGS. 1 and 3). The conventional position of the second handhold can also cause the user to assume poor posture by leaning or hunching forward when using the implement, and generally does not permit the user to perform certain motions comfortably such as thrusting the energetic device forward or sweeping the energetic device from side-to-side, resulting in inefficient use of the implement. Thirdly, the position and shape of the conventional handholds makes it difficult to support the rear portion of the implement (particularly an implement comprising a motor) in any manner other than by the user's wrist and arm. Furthermore, obtaining small, accurate movements of the energetic device in tight spaces and/or for tilted cutting on uneven or sloped terrain are prohibitively difficult using a conventional implement. Accordingly, improvements to the handle configuration of these and other implements held in a similar manner are desirable.

SUMMARY

Several embodiments of a handle configuration for a powered implement held by both hands are shown and described herein. In one representative embodiment, an implement comprises an elongated shaft having a first end portion that terminates with a cutting head or other energetic device, a second end portion to which a motor or other power source is mounted or coupled to provide power to the energetic device, a first handhold adjustably mounted to the shaft and extending outwardly therefrom, and an elongated member including a mounting portion and a handle portion having a second handhold. The mounting portion can be mounted to the first end portion of the shaft at a mounting location. The first handhold and the second handhold are configured such that the implement can be operated by a user with both arms in respective neutral arm positions and with both hands in respective neutral gripping positions. The elongated member can be configured such that a force applied to the second handhold by the user is transmitted through the elongated member and applied to the elongated shaft at the mounting location. In this manner, the user can grip the first and second handholds with both arms in respective neutral arm positions and with both hands in respective neutral gripping positions, allowing the user to support the weight of the implement easily. This can allow the user to use the implement for long periods of time without the injury risk associated with a pronated gripping position or ulnar deviation. The user can also effect small, accurate movements of the energetic device on the first end portion of the implement through the elongated member, and maintain proper posture during use.

In another representative embodiment, a handle kit for an implement comprises a first handle member configured to be adjustably mounted to and extend outwardly from a shaft of the implement in a manner as summarized above. The kit also includes an elongated member including a second handle member, wherein the elongated member is configured to be mounted to the shaft at a mounting point as summarized above. The elongated member can also be configured to be pivotable between a retracted position and an extended position when mounted on the shaft. The first handhold and the second handhold can be configured such that the implement is operable by a user with both arms in respective neutral arm positions and both hands in respective neutral gripping positions. The elongated member can also be configured such that force applied to the second handhold by the user is transmitted via the elongated member and applied to the elongated shaft at the mounting point. In this manner, the user can mount the first handle member and the elongated member to an existing implement after-market, allowing the user to grip the first and second handholds in neutral arm positions and neutral gripping positions. This can allow the user to support the weight of the implement easily and to use the implement for long periods of time without the injury risk associated with a pronated gripping position or ulnar deviation. The user can also effect small, accurate movements of the first end portion of the implement (and, thus, of the cutting head or other energetic device) through the elongated member, and maintain proper posture during use of the implement.

The "implement" with which the kit is useful is not limited to landscaping implements, and not limited to implements employing a rotating cutter or the like as an energetic device. Candidate implements include, for example, cutters, saws, blowers, pressure-washing wands, etc.

In another representative embodiment, a handle kit for an implement comprises a first handle member configured to be mounted to and extend outwardly from a shaft of the implement and a second handle member configured to be mounted to and extend outwardly from the shaft. The first handle member can include a control for controlling a motor of the implement. The first and second handle members can be configured to be gripped in a neutral gripping position by a user, and the first handle member can be configured to be gripped in a neutral arm position. In this manner, the user can mount the first handle member and the second handle member to a prior art implement, allowing the user to grip at least the first handle member in a neutral arm position, and to grip both handle members in neutral gripping positions. This can allow the user to support the weight of the implement easily and to operate it for long periods of time without the injury risk associated with a pronated gripping position or ulnar deviation. This can also allow the user to use the implement while maintaining erect, proper posture that reduces stress otherwise applied to the user's back, shoulders, and arms.

In another representative embodiment, an implement comprises an elongated shaft having a first end portion and a second end portion. The first end portion can include a cutting head as an energetic device (or can have any of various other energetic devices). The implement can also include a motor mounted to the shaft and configured to drive the energetic device, and a first handhold adjustably mounted to the shaft. The implement can also include an elongated member having a mounting portion and a handle portion including a second handhold. The mounting portion can be pivotably mounted to the first end portion of the shaft at a pivot location. The implement can also include a bracing member having a first end portion pivotably mounted to the shaft and a second end portion pivotably mounted to a bearing retained in a linear raceway or track on the elongated member. The elongated member can be pivotable between a retracted position and an extended position relative to the shaft as the elongated member is pivoted about the pivot point. The first and second handholds can be configured such that a user can operate the implement with both arms in respective neutral arm positions and both hands in respective neutral gripping positions, allowing the user to easily support the weight of the implement easily and to manipulate it for long periods of time during use without the injury risk associated with a pronated gripping position or ulnar deviation. The user can also effect small, accurate movements of the energetic device via the elongated member, while maintaining proper posture during use.

The foregoing and other objects, features, and advantages of the invention will become more apparent from the following detailed description, which proceeds with reference to the accompanying figures.

DETAILED DESCRIPTION

The present disclosure concerns embodiments of handles and handle configurations for an implement having a shaft and intended to be held by both hands during use, such as (but not limited to) a landscaping implement. These various implements can have one or more handles, and typically have at least two handles for carrying, holding, and maneuvering the implement during use. As used herein, the term "implement" refers to a device or tool that is at least partially handheld and powered (e.g., by a gasoline engine, electric motor, or remote power source). The device or tool includes an elongated shaft that facilitates coupling of the power source to an energetic device, for example, a cutting head or a nozzle from which a pressurized fluid is discharged. A landscaping implement can be configured to, for example, cut or trim vegetation, cut or trim tree branches, perform light tilling, or manipulate loose debris. A landscaping implement can include, without limitation, a vegetation (e.g., weed or grass) trimmer, a lawn edger, a brush cutter, a chainsaw or analogous tool with a saw-like cutting head, a pole saw, a hedge trimmer, a tiller, a limb or branch cutter, a mulcher, a pressure-washer wand, or a blower, to name a few. Candidate implements are not limited to those used by the general public, but rather include tools used for firefighting, and/or for clearing or cutting brush or vegetation (for, e.g., pipelines, etc.). Candidate implements can also include tools on which the cutting head is configured as an interchangeable attachment (e.g., interchangeable grass trimmer or chainsaw cutting head attachments).

Figure 2:
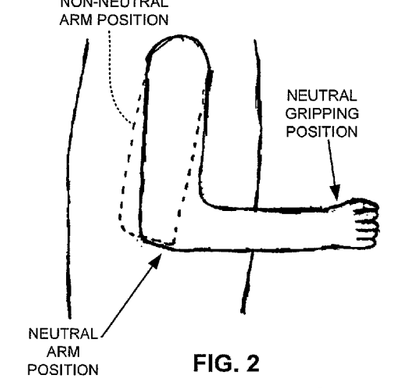
FIG. 2 is a side elevation view of a user's arm in a neutral arm position and the user's hand in a neutral gripping position.
Figure 3:
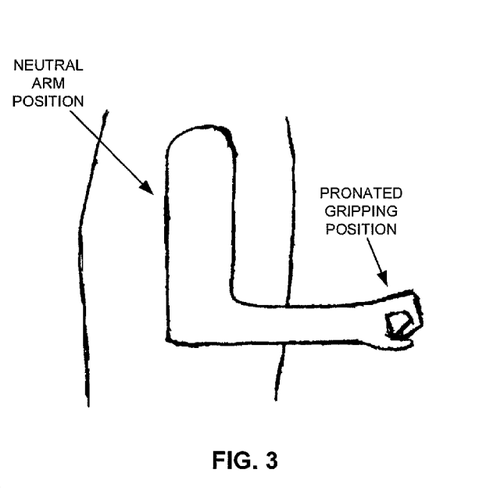
FIG. 3 is a side elevation view of a user's arm in a neutral arm position and the user's hand in a pronated gripping position.

As used herein, the term "neutral arm position" refers to a position of a user's arm in which the arm is generally at the respective side of the user's body, and the user's forearm and the upper arm form substantially a right angle at the elbow, as shown in FIGS. 2 and 3.

As used herein, the term "neutral gripping position" refers to a position of the hand in which the forearm is oriented such that the thumb is up, and the wrist is substantially in line with the forearm (i.e., the wrist is not substantially flexed or extended relative to the forearm), as shown in FIG. 2.

As used herein, the terms "pronated" and "pronated gripping position" refer to a position of the user's hand in which the forearm is oriented such that the palm is facing down, as shown in FIG. 3.

Figure 4:
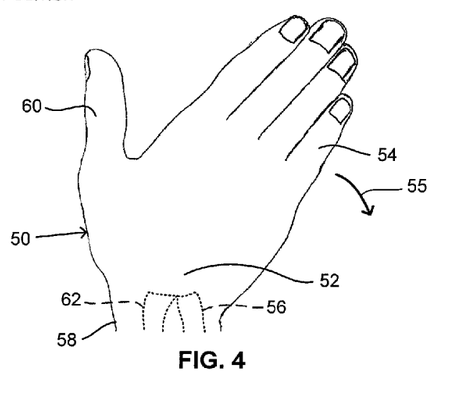
FIG. 4 is a plan view of a user's hand with the wrist in a position of ulnar deviation.

As used herein, the term "ulnar deviation" refers to a position of the user's hand 50 in which the wrist 52 is bent in the direction of arrow 55 with respect to the wrist 52 such that the little finger 54 is displaced toward the ulna bone 56 of the forearm 58, as shown in FIG. 4. Also shown in FIG. 4 are the location of a user's thumb 60 and radius bone 62 when the hand is in a position of ulnar deviation.

As used herein, the term "posture" refers to the orientation of the spine of the user. "Proper posture" refers to a neutral spinal orientation in which the erect skeleton of the user bears the weight of the user's head and upper body with minimal muscular effort. "Poor posture" refers to any non-neutral spinal orientation which additional muscular effort is required for the user to bear the weight of the user's head and upper body as, for example, when the user is stooping as shown in FIG. 1.

As used herein, the term "integrally formed" refers to a construction that does not include any welds, fasteners, or other means for securing separately formed pieces of material to each other.

Figure 5:
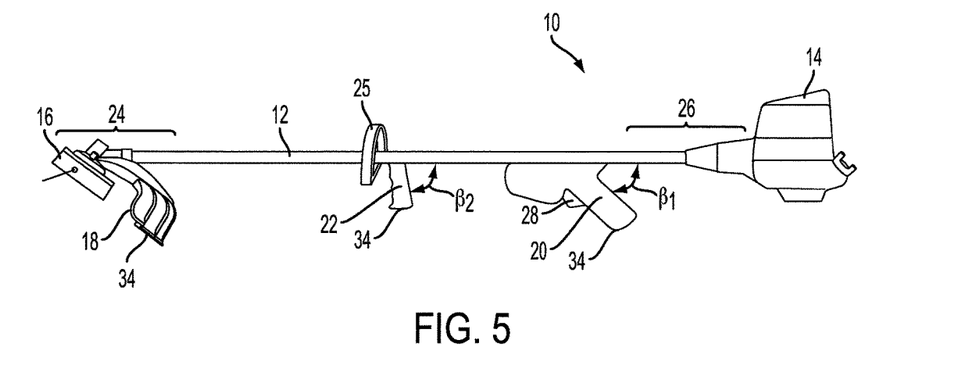
FIG. 5 is a side elevation view of a first representative embodiment of an implement.

Referring to FIG. 5, there is shown a first representative embodiment of an implement 10, comprising a shaft 12, a motor (as an exemplary power source) 14, a cutting head (as an exemplary energized device) 16, an optional guard 18, a first handle or handhold 20, and a second handle or handhold 22. The motor 14 is mounted on the shaft 12, and is configured to provide power to the cutting head 16, such as by rotating or reciprocating the cutting head 16 or elements of the cutting head 16. In the embodiment shown, the cutting head 16 is mounted on a front end portion (i.e., first end portion) 24 of the shaft 12, while the motor 14 is mounted on a rear end portion (i.e., second end portion) 26 of the shaft 12. In the embodiment shown, the motor 14 is a gasoline engine. However, in alternative embodiments, the motor 14 can be a gasoline engine or an electric motor, and can be mounted at any suitable location along the shaft or incorporated into the cutting head 16. The motor can also be located remotely from the implement and connected to the implement by hose or cable. An example of such an implement is a pressure-washing wand.

The cutting head 16 of this embodiment is an exemplary energetic device that includes a cutter such as a blade, filament, or wire disposed on a rotating head, wherein the cutter is configured to cut through vegetation such as grass, weeds, brush, etc., as the cutting head 16 is moved through the vegetation by the user. In the embodiment shown, the guard 18 is mounted to the shaft 12 rearwardly of the cutting head 16 so as to prevent the dispersal of, for example, cut vegetation, dirt, rocks, etc., by the cutting head 16 in the direction of the user. However, in alternative embodiments, the guard 18 may be located at any suitable location along the shaft 12, or may be omitted from the implement.

Figure 6:
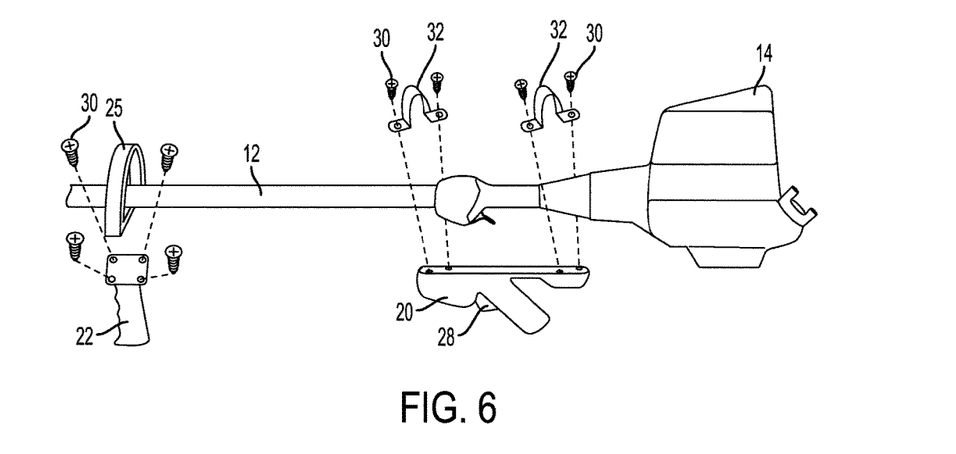
FIG. 6 is a first detail view of the embodiment of FIG. 5.
Figure 7:
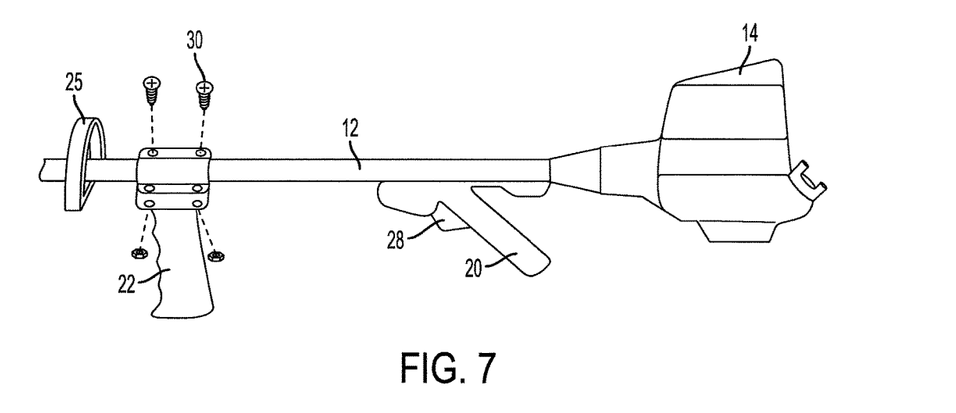
FIG. 7 is a second detail view of the embodiment of FIG. 5.

As shown in FIGS. 5-7, the first and second handles 20, 22 extend outwardly from the shaft 12 in the manner of, for example, pistol grips. The first and second handles 20, 22 can be configured to be positionally adjustable along the length of the shaft 12 and be rotatably adjustable about the shaft 12. In this manner, the handles 20, 22 can be optimally spaced along the shaft 12 and positioned relative to the angle of the cutting head 16 according to an individual user's preference. In the embodiment shown, the first handle 20 includes a motor control 28 for controlling the motor 14. However, in alternative embodiments, the motor control 28 may be located on, for example, either the first handle 20 or the second handle 22.

In the embodiment of FIG. 5, the first handle 20 is configured to extend laterally from the shaft 12, defining an angle $\beta_1$ therebetween. The angle $\beta_1$ allows the user to grip the first handle 20 comfortably in a neutral gripping position while maintaining a neutral arm position when using the implement 10. To such end, $\beta_1$ can be within a range of about 60° to about 110°, for example. Likewise, the second handle 22 of this embodiment extends below the shaft 12 and defines an angle $\beta_2$ therebetween. The angle $\beta_2$ allows the user to grip the second handle 22 comfortably in at least a neutral gripping position, regardless of the location of the second handle 22 along the length of the shaft 12. In this manner, the user can grip the handle 22 in a neutral gripping position while allowing the arm to remain in a neutral arm position or to be outstretched, according to the user's preference. In some embodiments, the first and second handles 20, 22 can be configured to allow the user to adjust the angles $\beta_1$ and $\beta_2$, respectively. The handles 20, 22 can be positioned and oriented to allow use of the implement by either a right-handed or left-handed person. The D-grip 25 can be retained for use by the user in carrying the implement with one hand, such as to or from a work site.

The arrangement of the handles 20, 22 discussed above also allows the user to support the weight of the implement 10 by, for example, cradling the rear end portion 24 of the shaft 12 with the forearm and upper arm of the arm gripping the first handle 20, while allowing the user to guide application of the implement 10 with the hand gripping the second handle 22. The neutral gripping position afforded to the hand gripping the second handle 22, combined with the second handle 22 being located generally midway along the shaft 12, also allows the user to have more accurate control of the cutting head 16 than prior art handles, which typically require the user to control the implement 10 from a pronated gripping position on a handle extending upward from the shaft. The respective positions and orientations of the handles 20, 22 relative to the shaft 12 allow the user to use the implement 10 for long periods of time while reducing the risk of maladies such as carpal tunnel syndrome, and while allowing the user to retain an erect, proper posture.

The first and second handles 20, 22 can be integrally formed with the shaft 12, can be separately mounted to the shaft 12 at the time of manufacture of the landscaping implement 10, or can be configured as after-market attachments to the implement. In some embodiments, the first and second handles 20, 22, along with the necessary mounting hardware, can be provided as a kit for after-market installation on suitable implements. For example, in the embodiment shown in FIGS. 5-7, the handles 20, 22 can be attached to the shaft 12 by fasteners 30 and/or clamps 32, as desired. The fasteners 30 can be configured to be placed on either side of the shaft 12, as shown in FIG. 6, or to pass through the shaft into the handles 20, 22, as shown in FIG. 7. Additionally, the handles 20, 22, along with the motor 14 and the guard 18, can include feet 34 for supporting the implement when it is placed on the ground or otherwise not in use, as shown in FIG. 1.

Additionally, the handles 20, 22 can be compatible with implements having lengthwise-extendable shafts (i.e., tools having a shaft that can be lengthened or shortened by, e.g., a telescoping shaft arrangement or removable shaft sections). The disclosed embodiment is also not limited to two handles, but can include any useful number of handles located at respective suitable locations along the shaft of the tool, as desired.

Referring now to FIGS. 8-14, there is shown a second representative embodiment of an implement 100. The implement 100 includes a shaft 102, a motor 104, a cutting head 106, a guard 108, a first handle or handhold 110, and an elongated member 112. The motor 104 is mounted on the shaft 102 and is configured to provide actuating power to the cutting head 106, such as by rotating or reciprocating the cutting head 106 or elements of the cutting head 106. In the embodiment shown, the cutting head 106 is mounted on a front end portion (i.e., first end portion) 114 of the shaft 102, while the motor 104 is mounted on a rear end portion (i.e., second end portion) 116 of the shaft 102. In the embodiment shown, the motor 104 is a gasoline engine. However, in alternative embodiments, the motor 104 can be another type of fuel-combusting engine or an electric motor, and, for example, can be mounted at any suitable location along the shaft 102 or incorporated into the cutting head 106. An electric motor can be powered by normal AC current or by a battery, as appropriate.

Figure 8:
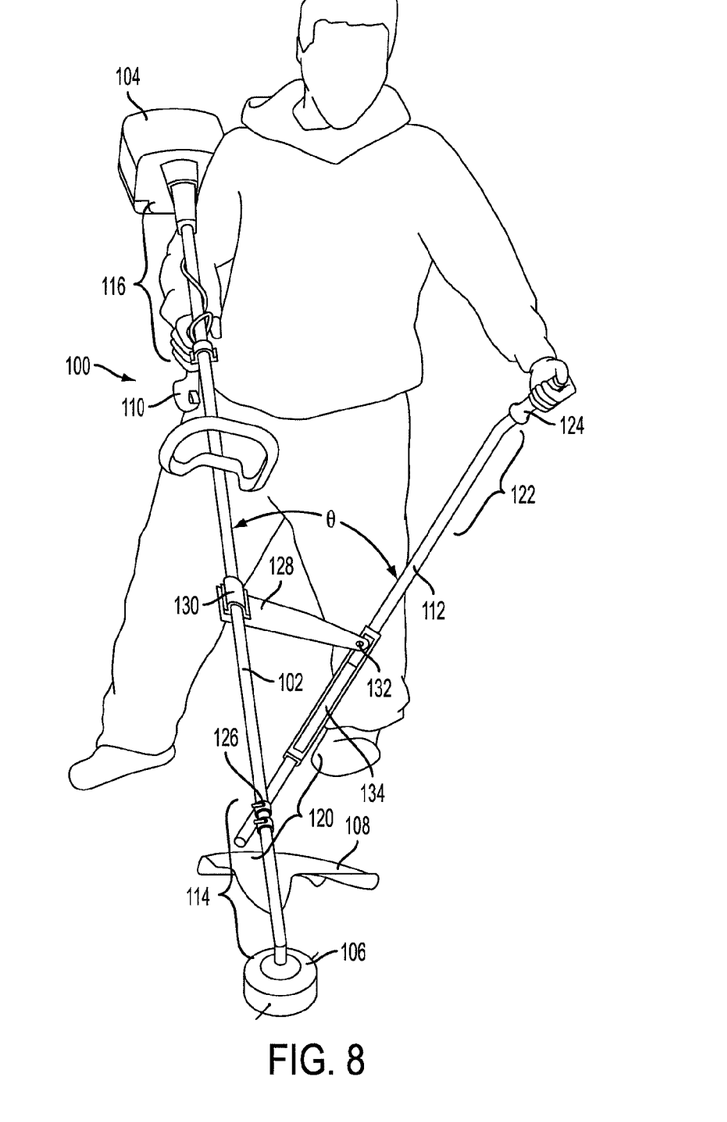
FIG. 8 is a front view of a second representative embodiment of an implement being held and operated by a user.

The cutting head 106 can include a cutter such as a blade, filament, or wire disposed on a rotating head that rotates the cutter at a high angular velocity to cut through vegetation such as grass, weeds, bushes, etc., as the cutting head 106 is moved through the vegetation by a user, similar to the embodiment of FIG. 5. In the embodiment shown, the guard 108 is mounted to the shaft 102 rearwardly of the cutting head 106 to prevent the dispersal of, for example, cut vegetation, dirt, rocks, etc., by the cutting head 106 in the direction of the user. However, in alternative embodiments, the guard 108 may be located at any suitable location along the shaft 102, or may be omitted from the implement 100.

Figure 9:
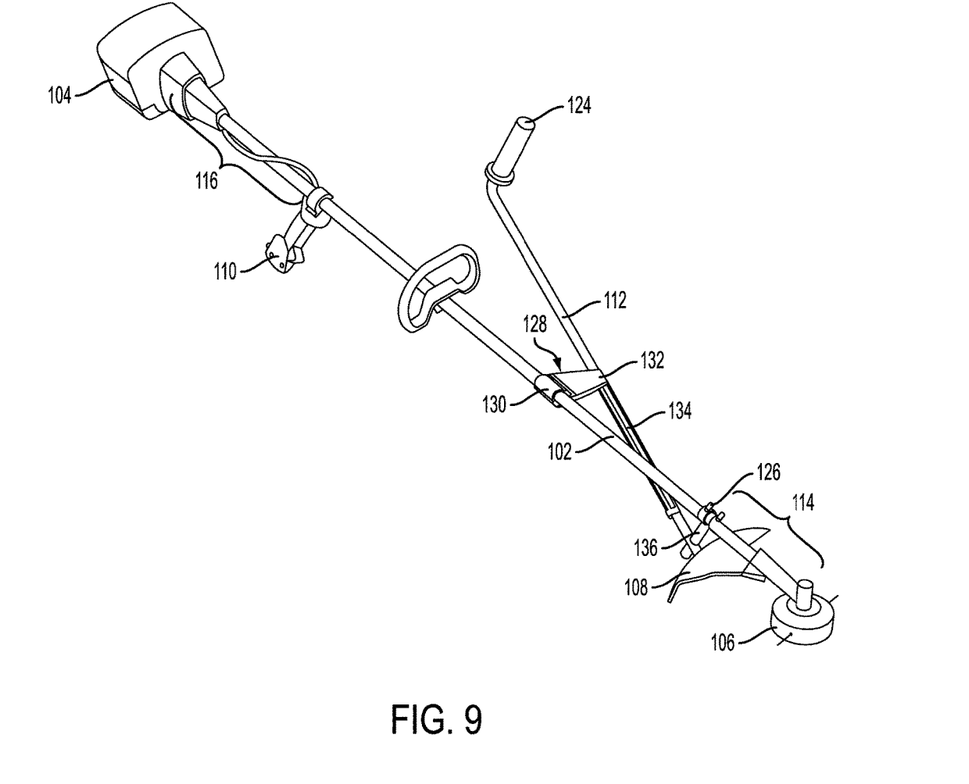
FIG. 9 is a perspective view of the embodiment of FIG. 8.
Figure 10:
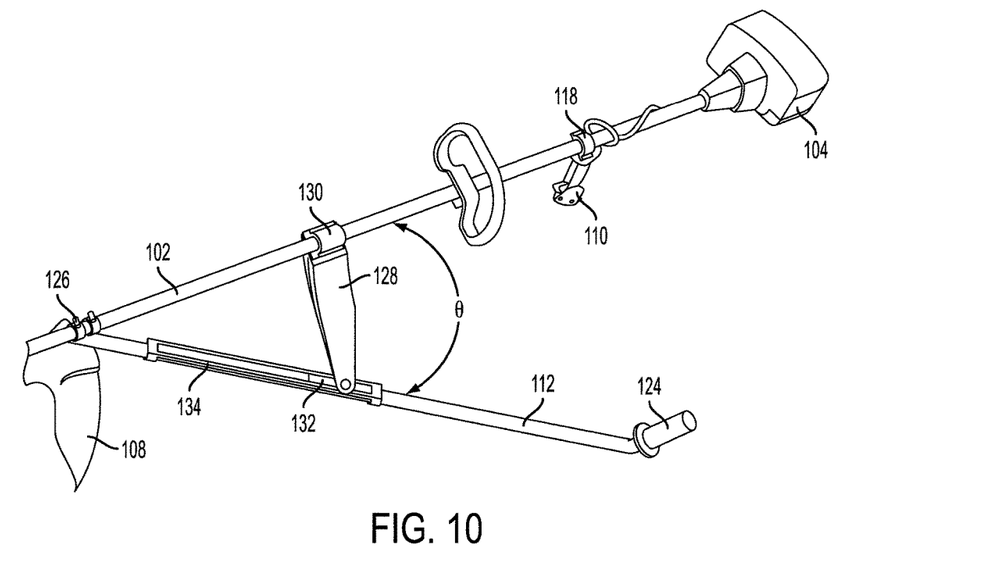
FIG. 10 is a top view of the embodiment of FIG. 8.
Figure 11:
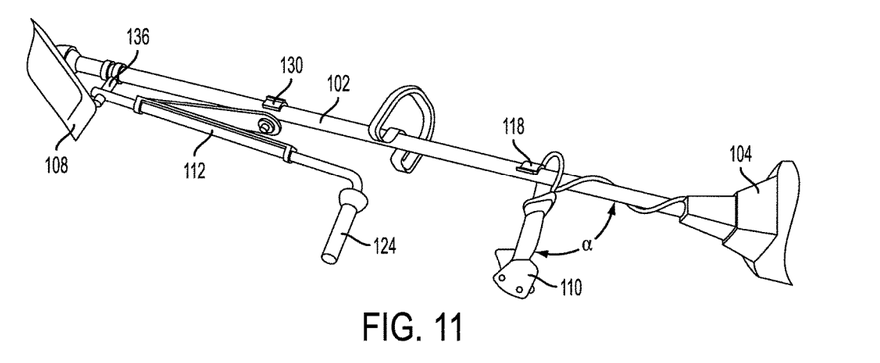
FIG. 11 is a side view of the embodiment of FIG. 8.

The first handle 110 of this embodiment is positionally adjustable along the length of the shaft 102 and rotatably adjustable about the shaft 102. More specifically, the first handle 110 extends from beneath the shaft 102, defining an angle α therebetween, as shown in FIG. 11. The angle α, which is preferably adjustable, allows the user to grip the first handle 110 in a neutral gripping position and a neutral arm position while using the implement. This also allows the user to support the weight of the implement 100 by, for example, cradling the rear end portion 116 of the shaft 102 with the forearm and upper arm of the arm gripping the first handle 110, as shown in FIGS. 8 and 9. In some embodiments, the first handle 110 can be configured to allow the user to adjust the angle α, according to the user's preference.

The first handle 110 can also include a motor control 118 for controlling the motor 104, as shown in FIG. 11. The motor control 118 can be located on the first handle 110 in a position such that it can be easily actuated by a user's forefinger, for example, for controlling, for example, the speed of the motor 104 and/or the rotational velocity of the cutting head 106. In alternative embodiments, the motor control 118 can be located at any suitable position along the length of the first handle 110, or on a second handle further described below.

Figure 12:
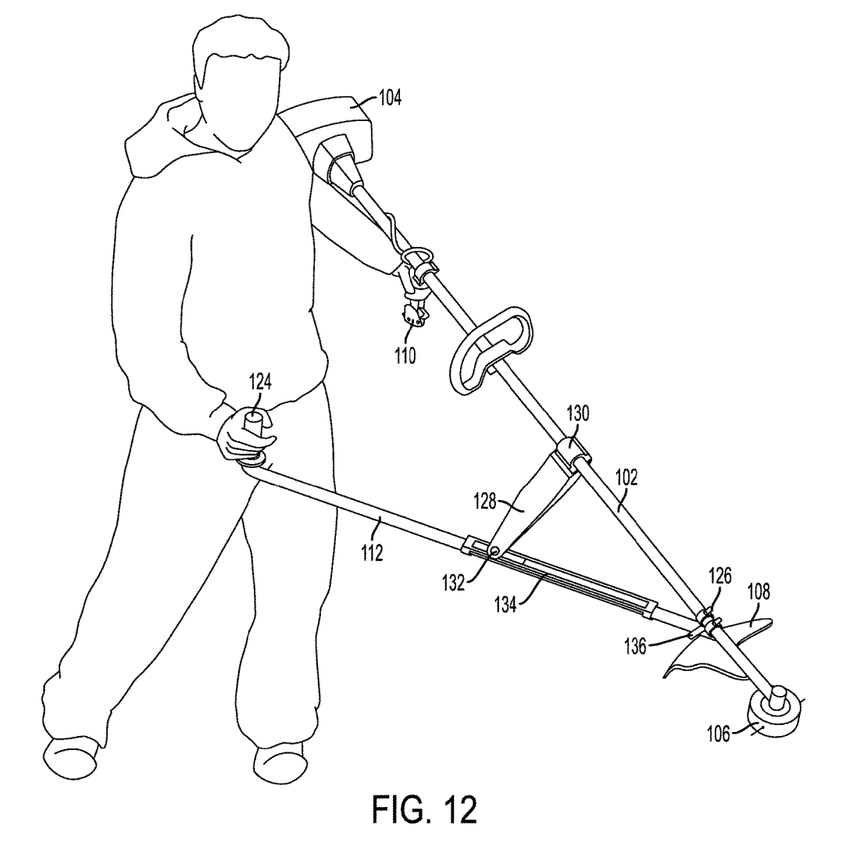
FIG. 12 is a perspective view of the embodiment of FIG. 8 being held and operated by a user.
Figure 13:
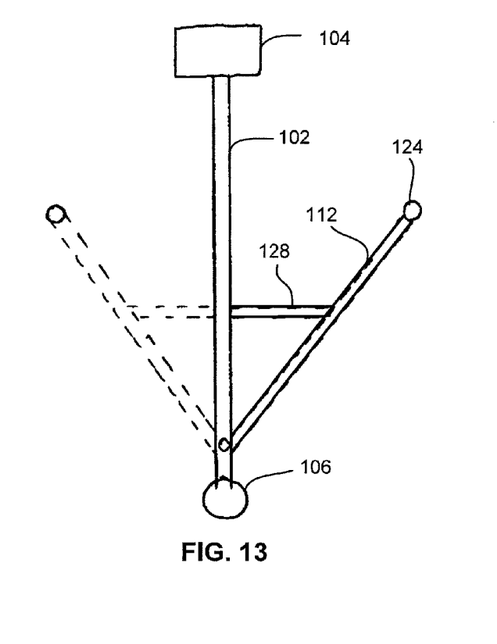
FIG. 13 is a plan view of the embodiment of FIG. 8 in a right-handed and a left-handed configuration.
Figure 14:
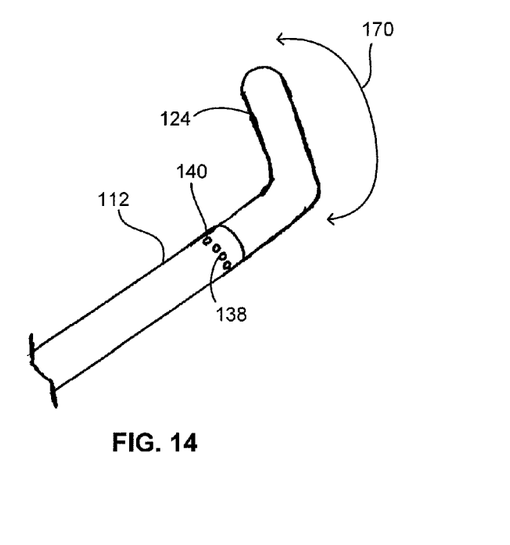
FIG. 14 is a detail view of a handle portion of the elongated member of the embodiment of FIG. 8.

Returning to FIG. 8, the elongated member 112 includes a mounting portion 120 and a handle portion 122. The handle portion 122 includes a second handle or handhold 124 mounted thereon. The second handle 124 has, or can be adjusted to have a substantially upright orientation allowing the second handle 124 to be gripped in a neutral gripping position and a neutral arm position, as shown in FIGS. 8, 9, and 12. In the embodiment shown, the elongated member 112 and the shaft 102 define an angle θ therebetween. The angle θ and the length of the elongated member 112 allow the user to grip the second handle 124 in a neutral arm position while retaining proper posture, as shown in FIGS. 8 and 9. In some embodiments, the length of the elongated member 112 is adjustable according to a particular user's preference, strength, and body size. The orientation of the second handle 124 can also be adjustable about the longitudinal axis of the elongated member 112 in the direction indicated by arrow 170 by, for example, the pin 138 and detent 140 system shown in FIG. 14. In some embodiments, the angle of the second handle 124 relative to the elongated member 112 can also be adjustable.

Figure 16:
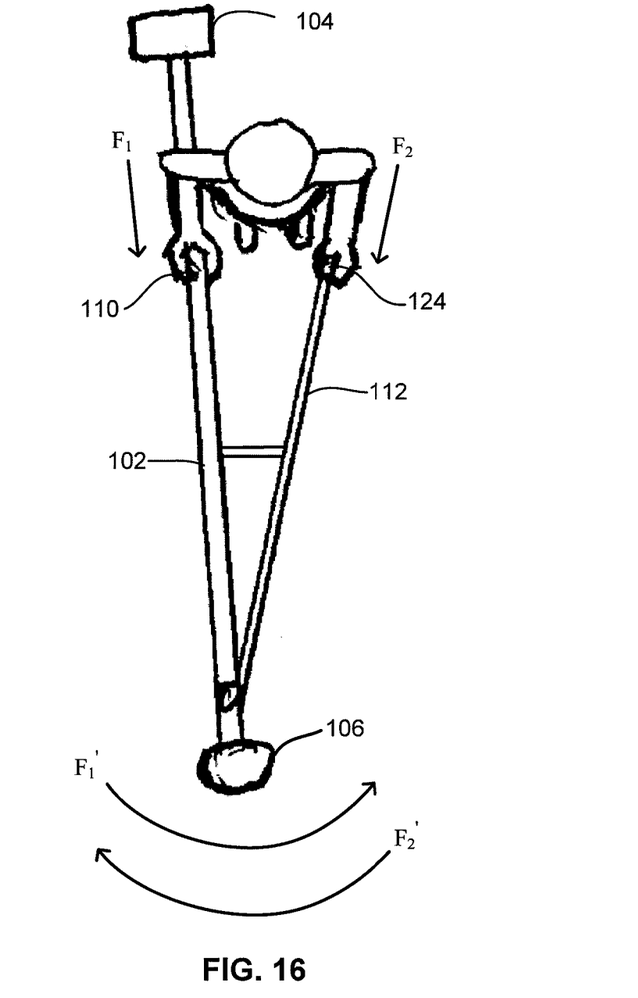
FIG. 16 is a plan view of the embodiment of FIG. 8 being held by a user.

In this embodiment, the mounting portion 120 of the elongated member 112 is mounted to the front portion 116 of the shaft 102 at a mounting point 126 proximate the cutting head 106 and/or the guard 108. In this manner, force applied to the second handle 124 by the user (e.g., to control the rotational velocity or orientation of the cutting head 106) is applied directly and efficiently to the shaft 102 at the mounting point 126 via the elongated member 112. This allows the user to execute small, precise movements of the cutting head 106 by correspondingly manipulating (e.g., applying respective outwardly directional forces to) the first and second handles 110, 124. Additionally, the position of the motor 104 on the rear end portion of the shaft 102 counterbalances the weight of the cutting head 106, allowing the handles 110, 124 to act as a fulcrum. In this manner, referring to FIG. 16, application of an outwardly directed first force $F_1$ to the first handle 110 results in motion of the cutting head 106 in the direction of arrow $F_1'$, while application of an outwardly directed second force $F_2$ to the second handle 124 results in motion of the cutting head 106 in the direction of arrow $F_2'$. This configuration allows the user to cut a wide swath of vegetation comfortably using the implement simply by rotating the arms (individually or together) and/or the torso, as shown in FIGS. 12 and 16, while maintaining neutral arm positions with both arms and neutral gripping positions with both hands, and without compromising proper posture. In alternative embodiments, the elongated member 112 can be mounted to the guard 108.

An additional advantage of the illustrated embodiment is the ability to fully utilize the biceps, triceps, deltoids, pectorals, and other associated muscle groups of the user's arms and back to manipulate the first and second handles 110, 124, resulting in greater strength, control, and user comfort than prior art devices. This arrangement of the first and second handles 110, 124 also allows the user to change the rotational orientation of the cutting head 106 easily by simply raising or lowering one handle relative to the other, without requiring the user to force his or her wrists further into uncomfortable, pronated gripping positions or ulnar deviations, as with prior art devices. In this manner, the orientation of the cutting head 106 is easily adjusted when working on, for example, upwardly or downwardly inclined terrain, or when working in tight spaces. This arrangement can also allow the user to more effectively manage forces imparted to the implement caused by, for example, the implement striking heavy or immovable objects (i.e., rocks, fences, turf, etc.) with the cutting head 106 during use.

The elongated member 112 of this embodiment is pivotable about its mounting point 126, such that the elongated member 112 can be movable to any convenient position between an extended position (e.g., FIG. 10) and a retracted position (FIG. 11). In this manner, the elongated member 112 can be extended when the implement is in use, and retracted against the shaft 102 for storage. The implement can be used when the elongated member is in the fully extended position, the fully retracted position, or any intermediate position therebetween.

In some embodiments, the elongated member 112 can be configured such that it can be lengthened and shortened by, for example, a telescoping tube arrangement or removable shaft sections. In this manner, when the elongated member 112 is in the retracted position, the second handle 124 can be rotated into a downwardly extending position, as discussed above with reference to FIG. 14, and the elongated member 112 can be lengthened or shortened as appropriate to provide a handle configuration similar to the embodiment of FIG. 5. Additionally, the elongated member 112 of this embodiment is pivotably extendable relative to either side of the shaft 102 so that the landscaping implement 100 can be selectably usable by right-handed users (see, e.g., FIGS. 9 and 13) or left-handed users (see, e.g., FIGS. 12 and 13).

In some embodiments, the elongated member 112 is interconnected to the shaft 102 by an offset 136 located at the mounting point 126, as shown in FIGS. 9 and 11. In these embodiments, the offset 136 allows the elongated member 112 to be offset vertically from the shaft 102 while still being pivotable about the connecting member 136 fully to the left and right.

The embodiment of an implement 100 as shown in FIGS. 8-12 includes a bracing member 128 interconnecting the shaft 102 and the elongated member 112. The bracing member 128 of the depicted embodiment is pivotably mounted to the shaft 102 by, for example, a mounting bracket 130. The bracing member 128 has a length which, together with the location of the bracing member 128 along the shaft 102, defines the angle θ between the shaft 102 and the elongated member 112 (see FIGS. 8 and 10). The bracing member 128 in this embodiment is movably mounted to the elongated member 112 by, for example, a slide-bearing 132 retained in a raceway 134 extending lengthwise on the elongated member 112. The elongated member 112 moves between the retracted position and the extended position as the slide-bearing 132 travels in the raceway 134 and the bracing member 128 pivots about the mounting bracket 130 and the slide-bearing 132. In this manner, the bracing member 128 provides substantial stiffening of the elongated member 112, regardless of the angle θ selected by the user, whenever the elongated member 112 is in the extended position. The bracing member 128 pivots along with the elongated member 112 whenever the elongated member 112 is being moved to the retracted position. In alternative embodiments, the elongated member 112 need not include a slide-bearing 132 and raceway 134, but can instead include, for example, a slot accommodating travel of a pin located on the bracing member 128. In further alternative embodiments, the raceway 134 can be located on the shaft 102.

In some embodiments, the implement 100 can further include a harness (not shown) worn by the user and attached to the implement 100 at one or more points along, for example, the shaft 102 and/or the elongated member 112. In certain situations, a harness facilitates support by the user of the weight of the implement 100.

The first and second handles 110, 124 can be integrally formed with the shaft 102 or elongated member 112, respectively, or can be separately mounted to the shaft 102 or elongated member 112 at the time of manufacture of the implement 100. In some embodiments, the first and second handles 110, 124 can be configured as after-market attachments to the implement 100. In some embodiments, the first and second handles 110, 124, along with the necessary mounting hardware, are provided as a kit for after-market installation. For example, the handles 110, 124 can be attachable to the shaft 102 using, for example, fasteners, brackets, clamps, etc., as desired.

Figure 15:
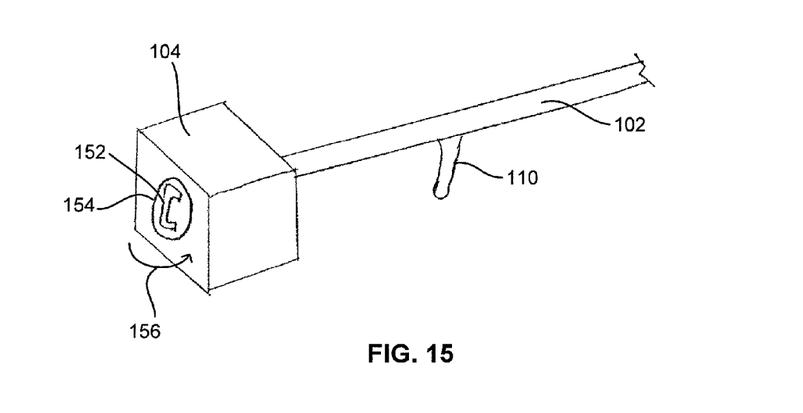
FIG. 15 is a perspective view of a third representative embodiment, including a third handle.

Another representative embodiment shown in FIG. 15, in which the implement includes a third handle 152 mounted on, for example, the motor 104. The third handle 152 can be in place of, or in addition to, the second handle 124. The third handle 152 can be rotatably adjustable, such as by being mounted to a rotating mounting plate 154. In this manner, the user can adjust the orientation of the third handle 152 to maintain a neutral gripping position when gripping the third handle 152. Gripping the first handle 110 and the rear handle 152 can increase the distance that the user can thrust the cutting head 106 forward when, for example, working on inclined terrain, trimming tall vegetation, trimming tree limbs, etc. In some embodiments, the rear handle 152 can be integrally formed with the casing of the motor 104 by, for example, injection molding, or can be attached or mounted to the motor 104 by, for example, fasteners. In alternative embodiments, the third handle 152 need not be mounted on the motor 104 but can be mounted at any suitable location along the second end portion 116 of the shaft 102. Additionally, in some embodiments, the first handle 110 and elongated member 112 can also be configured for use on implements having length-wise extendable shafts (i.e., implements having a shaft that can be lengthened or shortened by, for example, a telescoping shaft arrangement or removable shaft sections).

Figure 17:
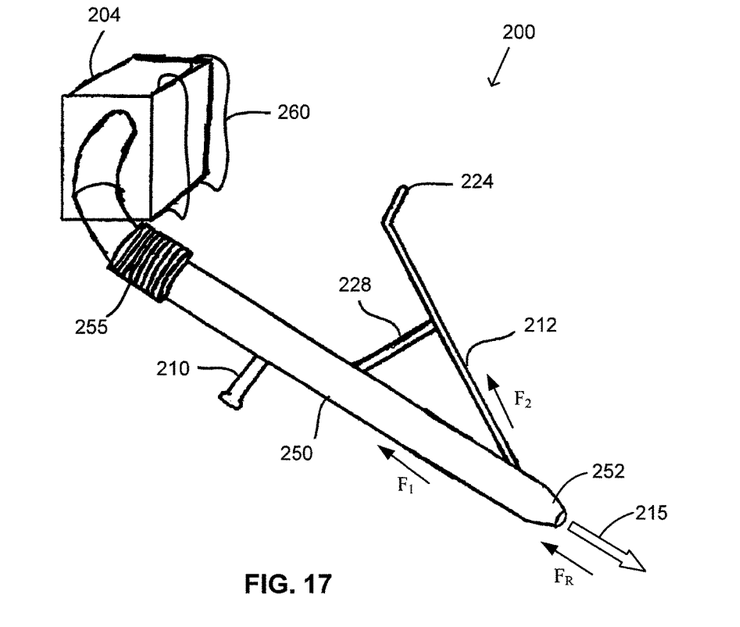
FIG. 17 is a side elevation view of a fourth representative embodiment configured as a blower.

In some embodiments, handles and elongated members similar to the first handle 110 and elongated member 112 can be configured for use on other implements that include elongated shafts or tubes, such as (but not limited to) implements configured to eject a fluid stream from a nozzle at high velocity. (Such a nozzle is another exemplary energetic device.) For example, FIG. 17 illustrates a representative embodiment of a blower 200 configured to eject an air stream from a nozzle 252 of a blower tube 250 via a flexible coupling 255 at a high velocity in a direction indicated by arrow 215. In the embodiment of FIG. 17, a motor 204 is carried on a user's back with straps 260, and a first handle 210, bracing member 228, and elongated member 212 are attached to the blower tube 250 via a flexible coupling 255. The elongated member 212 includes a second handle 224, which can be pivotable with respect to the blower tube 250 in a manner similar to the embodiments described above. In this manner, the handles 210, 224 and the elongated member 212 can provide a greater degree of precision and control of the nozzle 252 (or other energetic device), as described above.

In addition, the handles 210, 224 and the elongated member 212 can also help the user to bear the reactionary forces imparted against the user's arms and/or body by ejection of the fluid stream from the nozzle 252 by dividing those forces more equally or comfortably between the user's arms. For example, ejection of an air stream from the nozzle 252 in the direction of arrow 215 can cause a reactionary force generally in the direction of arrow $F_R$. Use of the elongated member 212 with the blower 200 can divide the reactionary force $F_R$ between the blower tube 250 and the elongated member 212, allowing a first proportion of the reactionary force $F_1$ to be transmitted along the blower tube 250, and a second proportion of the reactionary force $F_2$ to be transmitted along the elongated member 212. Thus, the first proportion of the reactionary force $F_1$ can be borne by the arm gripping the first handle 210, and the second proportion of the reactionary force $F_2$ can be borne by the arm gripping the second handle 224. This division of the reactionary forces reduces user fatigue otherwise associated with having to bear the reactionary force $F_R$ principally with one arm, as with prior art devices. Thus, the user can use the blower 200 for longer periods of time while maintaining a neutral arm position with both arms and a neutral gripping position with both hands.

Figure 18:
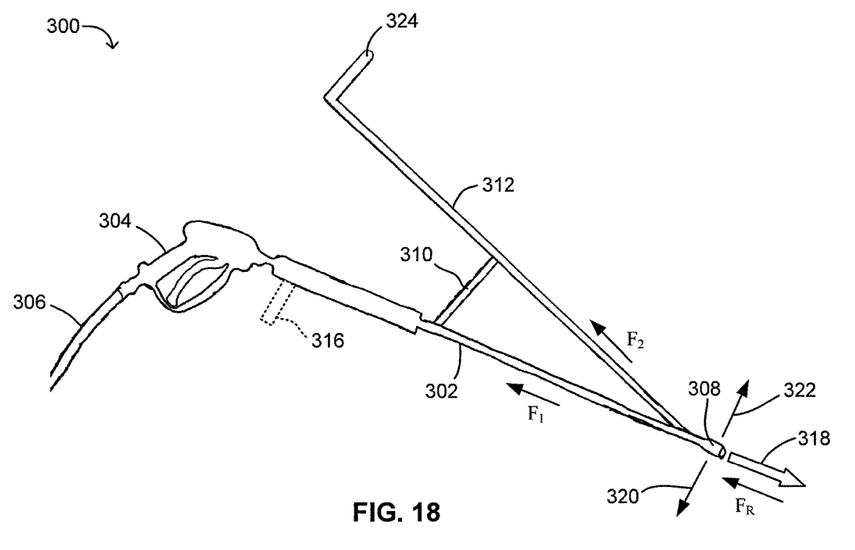
FIG. 18 is a side elevation view of a fifth representative embodiment configured as a pressure-washer wand.

FIG. 18 illustrates another representative embodiment of an implement 300 configured as a pressure-washer wand. The wand 300 includes a shaft 302 including an integral handle 304. The wand 300 be connected to a high-pressure fluid source, such as a water source, by a hose 306. The wand 300 can further include an elongated member 312 including a second handle 324. The elongated member 312 can be coupled to the shaft 302 near a fluid-discharge nozzle 308 (as an exemplary energetic device), and can further include a bracing member 310. In some embodiments, the wand 300 can further include a handle member 316 (indicated in phantom) similar to the first handle member of FIGS. 8-14.

The wand 300 can be configured to eject a stream of water or other fluid at high pressure in a direction indicated by arrow 318, which can generate a substantial reactionary force indicated at $F_R$. The elongated member 312 facilitates division of the reactionary force $F_R$ between the wand 302 and the elongated member 312, such that a first proportion $F_1$ of the reactionary force is transmitted along the shaft 302 and a second proportion $F_2$ of the reactionary force is transmitted along the elongated member 312, similar to the embodiment of FIG. 16. The elongated member 312 can also help a user to counter tendencies for the distal end of the wand 300 to move laterally in the directions indicated by arrows 320, 322 due to, for example, force imbalances on the wand 300 caused by the weight of the hose 306 acting on the proximal end of the shaft 302 and lateral components of the reactive force $F_R$ acting on the distal end of the shaft 302. Thus, holding the implement using the elongated member 312 and associated handle(s) can reduce the fatigue associated with bearing the reactionary forces $F_R$ principally with one arm, as with prior art devices, allowing the user to use the wand 300 for longer periods of time while maintaining a neutral arm position with both arms and a neutral gripping position with both hands.

General Considerations

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. As used herein, the terms "a", "an," and "at least one" encompass one or more of a specified element. That is, if two of a particular element are present, one of these elements is also present and thus "an" element is present. The terms "a plurality of" and "plural" mean two or more of the specified elements.

As used herein, the term "and/or" used between the last two of a list of elements means any one or more of the listed elements. For example, the phrase "A, B, and/or C" means "A," "B," "C," "A and B," "A and C," "B and C" or "A, B and C."

As used herein, the term "coupled" generally means physically coupled or linked and does not exclude the presence of intermediate elements between the coupled items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

In view of the many possible embodiments to which the principles of the disclosure may be applied, it should be recognized that the illustrated embodiments are only representative examples and should not be taken as limiting the scope of the disclosure. Rather, the scope of the disclosure is defined by the following claims.

What is claimed is:

1. An implement holdable by a user during use of the implement, comprising:
   an elongated shaft having a first end portion and a second end portion;
   a first handhold adjustably mounted to the shaft and extending radially outwardly therefrom at an angle to the shaft;
   an elongated member including a mounting portion and an opposing handle portion, the handle portion having a second handhold extending radially outwardly from the elongated member at an angle and in a direction opposite to a direction of the first handhold, and the mounting portion being mounted to the first end portion of the shaft at a mounting location, the elongated member being pivotable relative to the shaft about the mounting location between an extended position, in which the elongated member is on the opposite side of the user's body from the shaft, and a retracted position, in which the elongated member is on the same side of the user's body as the shaft when the user is holding the implement; and
   a bracing member coupling together the shaft and the elongated member, the bracing member being movable between a retracted position corresponding to the retracted position of the elongated member, and an extended position corresponding to the extended position of the elongated member, the bracing member being pivotably coupled to the shaft by a mounting bracket, and pivotably coupled to the elongated member by a slide-bearing, the slide-bearing being retained in a raceway extending lengthwise along the elongated member, the raceway including a first end adjacent the mounting portion and a second end spaced apart from the first end along the elongated member in a direction toward the second handhold, the slide-bearing being located at the first end of the raceway when the elongated member is in the retracted position, and located at the second end of the raceway when the elongated member is in the extended position;

wherein the first handhold and the second handhold are parallel to each other and configured such that the implement can be held and operated by a user with both arms of the user being in respective neutral arm positions in which the user's arms are at the user's sides, and the upper arm and forearm of each of the user's arms form a right angle at the elbow, and such that both hands of the user are in respective neutral gripping positions in which the thumb of each hand is oriented upwardly, and the wrist and forearm of each of the user's arms are aligned with each other; and the elongated member is configured such that a first force applied by the user to the first handhold relative to a second force applied by the user to the second handhold is transmitted through the elongated member and applied to the elongated shaft at the mounting location.

2. The implement of claim 1, further comprising a power source and an energetic device on the first end portion of the elongated shaft, wherein the energetic device is coupled to and operated by the power source, and the mounting location of the elongated member is adjacent the energetic device.

3. The implement of claim 2, wherein at least one of the first and second handholds comprises a control for controlling operation of at least the power source.

4. The implement of claim 2, wherein the energetic device is selected from the group consisting of rotating cutters and fluid-discharge nozzles.

5. The implement of claim 2, wherein the energetic device comprises a fluid-discharge nozzle.

6. The implement of claim 1, wherein the elongated member is pivotable relative to left and right sides of the elongated shaft.

7. The implement of claim 1, wherein an angle defined between the elongated shaft and the elongated member is continuously adjustable between the retracted position and the extended position.

8. The implement of claim 1, wherein the first handhold is positionally adjustable along the shaft and rotatably adjustable about the shaft.

9. The implement of claim 1, configured as a landscaping implement.

10. The implement of claim 9, selected from the group consisting of vegetation trimmers, edgers, pressure-washer wands, and blowers.

11. The implement of claim 1, configured as a pressurized fluid-discharge device.

12. The implement of claim 1, further comprising a third handhold adjustably mounted to the second end portion of the elongated shaft.

13. A handle kit for a powered implement, comprising:
a first handle member configured to be adjustably mounted to a shaft of the implement so as to extend radially outwardly from the shaft at an angle to the shaft;

an elongated member including a second handle member extending radially outwardly from the elongated member at an angle and in a direction opposite to a direction of the first handhold, the elongated member being mountable to the shaft at a mounting location, the elongated member being pivotable, when mounted to the shaft, relative to the shaft about the mounting location between an extended position, in which the elongated member is on the opposite side of the user's body from the shaft, and a retracted position, in which the elongated member is on the same side of the user's body as the shaft when the user is holding the implement; and a bracing member configured to couple together the shaft and the elongated member when installed on the shaft and the elongated member, the bracing member being movable between a retracted position corresponding to the retracted position of the elongated member, and an extended position corresponding to the extended position of the elongated member, the bracing member being pivotably couplable to the shaft by a mounting bracket, and pivotably couplable to the elongated member by a slide-bearing, the slide-bearing being retained in a raceway extending lengthwise along the elongated member, the raceway including a first end adjacent the mounting portion and a second end spaced apart from the first end along the elongated member in a direction toward the second handle member, the slide-bearing being located at the first end of the raceway when the elongated member is in the retracted position, and located at the second end of the raceway when the elongated member is in the extended position;

the first handle member and the second handle member being configured so that the implement can be operated by a user with both the user's arms being in respective neutral arm positions in which the user's arms are at the user's sides, and the upper arm and forearm of each of the user's arms form a right angle at the elbow, and both the user's hands being in respective neutral gripping positions in which the thumb of each hand is oriented upwardly, and the wrist and forearm of each of the user's arms are aligned with each other; and wherein the elongated member is configured such that at least a portion of respective forces applied to the first and second handle members by the user is transmitted via the elongated member and applied to the shaft at the mounting location when the elongated member is coupled to the shaft.

14. The handle kit of claim 13, wherein the implement is selected from the group consisting of vegetation cutters and pressurized-fluid-discharge devices.

15. An implement for cutting vegetation, comprising:
an elongated shaft comprising a first end portion and a second end portion, the first end portion including a cutting head coupled thereto;

a motor coupled to the shaft and configured to provide power to the cutting head;

a first handhold adjustably mounted to the shaft and extending radially outwardly therefrom at an angle to the shaft;

an elongated member including a mounting portion and a handle portion, the handle portion comprising a second handhold extending radially outwardly from the elongated member at an angle and in a direction that is opposite to a direction of the first handhold, and the mounting portion being pivotably mounted to the first end portion of the shaft at a pivot location such that the elongated member is pivotable relative to the shaft about the pivot location between an extended position, in which the elongated member is on the opposite side of a user's body from the shaft, and a retracted position, in which the elongated member is on the same side of the user's body as the shaft when the user is holding the implement; and a bracing member having a first end portion pivotably mounted to the shaft, and a second end portion pivotably mounted to a linear bearing on the elongated member, the bracing member being movable between a retracted position corresponding to the retracted position of the elongated member, and an extended position corresponding to the extended position of the elongated member, the bracing member being pivotably coupled to the shaft by a mounting bracket, the linear bearing comprising a slide-bearing retained in a raceway, the raceway extending lengthwise along the elongated member, the raceway including a first end adjacent the mounting portion and a second end spaced apart from the first end along the elongated member in a direction toward the second handhold, the slide-bearing being located at the first end of the raceway when the elongated member is in the retracted position, and located at the second end of the raceway when the elongated member is in the extended position;

wherein the first and second handholds are parallel to each other and configured such that a user can operate the implement with both arms in respective neutral arm positions in which the user's arms are at the user's sides, and the upper arm and forearm of each of the user's arms form a right angle at the elbow, and such that both hands are in respective neutral gripping positions in which the thumb of each hand is oriented upwardly, and the wrist and forearm of each of the user's arms are aligned with each other.

* * * * *